July 9, 1968  R. MATHEY  3,391,560

ELECTROACOUSTIC VIBRATOR MEASURING SYSTEM

Filed Dec. 10, 1965  2 Sheets—Sheet 1

INVENTOR
RAYMOND MATHEY
BY
ATTORNEY

United States Patent Office 3,391,560
Patented July 9, 1968

3,391,560
ELECTROACOUSTIC VIBRATOR
MEASURING SYSTEM
Raymond Mathey, Paris, France, assignor to CSF—
Compagnie Generale Sans Fil, a corporation of
France
Filed Dec. 10, 1965, Ser. No. 512,853
Claims priority, application France, Dec. 12, 1964
998,377
7 Claims. (Cl. 73—67.2)

ABSTRACT OF THE DISCLOSURE

An electroacoustic vibrator system comprises, for vibrating a mechanical structure, an electromechanical square-law transducer having an exciter circuit included in a bridge which is balanced when the structure is at rest. A feedback loop, tuned by a filter to half the resonant frequency of the mechanical structure, is connected between the terminals of one diagonal of the bridge and the terminals of the other diagonal.

There are known numerous apparatus for evaluating certain physical quantities by exciting and analysing mechanical vibrations of a suitable nature. Amongst these may be named: dynamic testing of materials, the determination of natural mechanical resonance frequencies, the detection of flaws and the measurement of the gyroscopic effect. In all these measuring techniques, a structure is set into oscillation and suitably arranged electromechanical transducers supply electrical signals, having a pulsatance or angular frequency which is equal to that of the vibration.

In view of the smallness of the detected amplitudes, it is essential that the driving circuits and the receiving circuits should be well decoupled from each other. It is particularly difficult to effect this decoupling when these circuits carry signals with the same frequency. Most of known transducers are linear transducers which convert mechanical quantities into electrical quantities and vice versa, while maintaining the angular frequency of the phenomena, which involves a risk of a particularly undesirable cross coupling if the pick-up level is very low. Known methods devised for reducing the cross coupling between the driving and the pick-up device are rather intricate and fairly critical in their application.

It is an object of the present invention to avoid such drawbacks.

According to the invention there is provided an electroacoustic vibrator system comprising an electromechanical square-law transducer coupled to a mechanical vibrating structure having a resonant frequency and connected to a bridge, said bridge being balanced with said structure at rest; said signal being fed back to said bridge through a feedback loop including filtering means tuned to half said resonant frequency.

For a better understanding of the invention and to show how the same may be carried into effect, reference will be made to the drawing accompanying the following description and in which.

In all the figures the same reference numerals have been used for the same elements.

Figure 1:
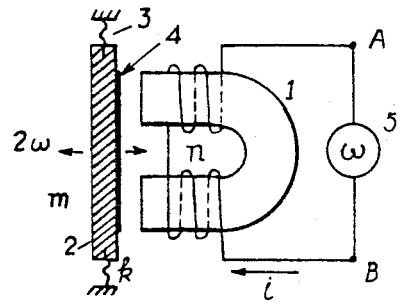
FIG. 1 is a diagram of an electromechanical magnetic transducer which is one of the main parts of the arrangement according to the invention.

In FIG. 1 there is shown an electromagnet 1 fed by a generator 5. A current $i$, having an angular frequency $\omega$ flows through the $n$ turns of the inductor winding. This electromagnet exerts an attraction with the fundamental pulsatance $2\omega$ on a ferromagnetic layer 4 forming the mobile armature of the electromagnet. This layer is carried by a mechanical vibrating system having one degree of freedom which comprises a plate 2 of mass $m$ suspended resiliently by means of a spring 3 having a stiffness $k$. The natural resonance angular frequency of the mechanical system is $2\omega$ and the mechanical damping is sufficiently weak for the resonance to be sharp.

This mechanical-electrical assembly forms a transducer which establishes a bilateral correspondence between mechanical and electrical quantities. Its operation as motor is well known. The attractive force is proportional to the square of the current. The fundamental component has an angular frequency $2\omega$ which is equal to the natural resonance frequency of the system so that the armature undergoes a quasi-sinusoidal vibrating movement.

Figure 2:
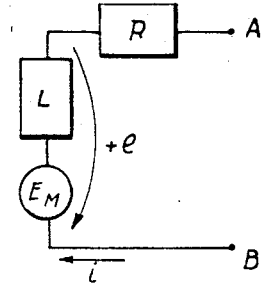
FIG. 2 is the equivalent electric circuit of the transducer.

The diagram of FIG. 2 is an equivalent electric circuit explaining the properties of the transducer of FIG. 1 used as a pick-up device which converts mechanical vibrations into electrical signals. It must be understood that it operates simultaneously as a driving transducer, i.e., it sets the system into vibration, and as a pick-up mechanoelectrical transducer for the vibrations thus created. The diagram of FIG. 2 comprises an inductance L and a resistor R, which are the inductance and resistor of the winding at rest, and an A.C. voltage generator which corresponds to the motional voltage resulting from the modulation of the magnetic flux by the vibrations of plate 2.

It should be noted that there is an $\omega$-line in the spectrum of the motional voltage $E_M$, which angular frequency is half the angular frequency of the mechanical vibration of the system.

The invention provides means for isolating the component of the motional voltage $E_M$ having this angular frequency from the other terms existing in the voltage between the terminals A and B of the transducer winding.

Figure 3:
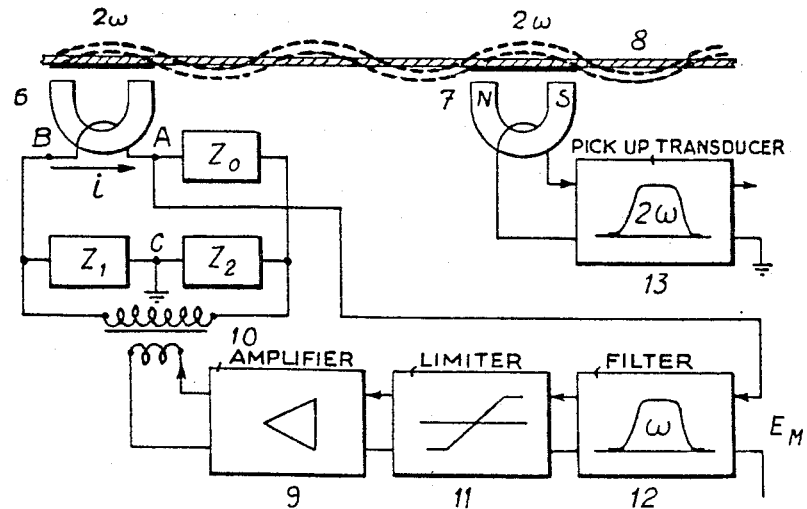
FIG. 3 is a block diagram of the arrangement according to the invention.

In FIG. 3, there is shown a vibrating bar 8 which is excited by a transducer 6 in accordance with the invention and whose vibration speed is being measured by means of a conventional pick-up transducer 7 of the variable reluctance type. It may be seen from the drawing that the essential difference between the two transducers 6 and 7 is that the transducer of the known type 7 uses a magnetic circuit with permanent magnet whilst the device according to the invention 6 comprises a soft iron laminated core with low losses. The transducer 6 acts simultaneously as a driving and as a pick-up transducer and is used according to FIG. 1 for setting the bar 8 into oscillation. To this end, the transducer forms with impedances $Z_1$, $Z_2$ and $Z_0$ a Wheatstone bridge, in such a manner that equilibrium exists between the terminal A and the terminal C, which is grounded, when the bar is clamped. When the bar is vibrating, the motional voltage $E_M$ appears between terminals A and C, and current $i$ flows in transformer 10.

The motional voltage contains the harmonics of $\omega$ which are filtered out by means of a filter 12, for example, a band pass filter tuned to $\omega$. The residual voltage passes through a limiter 11, which is aimed at stabilizing the vibration amplitude of the bar to a predetermined value. The frequency filtered and amplitude limited voltage is applied to the input of an amplifier 9 whose output is loaded by the primary of the transformer 10. The feedback loop formed in this way provides a self-oscillation when the phase and amplitude of the signal meet the oscillating conditions. The voltage drop caused by the transducer winding is thus compensated.

The advantage of the system according to the invention is that the driving circuit does not contain signals at the frequency 2ω at which the bar vibrates. A linear pick-up transducer, for example, a variable reluctance transducer 7, placed near the bar supplies a 2ω signal as known in the art. It can also collect by mutual induction a parasitic voltage at the frequency ω derived from the stray radiation of the driving circuit. According to the invention, a filter 13 is mounted at the output of transducer 7 to reject this parasitic voltage. It is, for example, a bandpass filter tuned to 2ω.

Owing to the arrangement according to the invention as shown in FIG. 3, the cross coupling between the pick-up and the driving circuits is substantially reduced.

The arrangement of FIG. 3 is given merely by way of example, the essential feature of the invention consisting in using an electromechanical transducer wherein the mechanical force generated is a quadratic function of the excitation signal amplitude, i.e., a square-law transducer.

Figure 4:
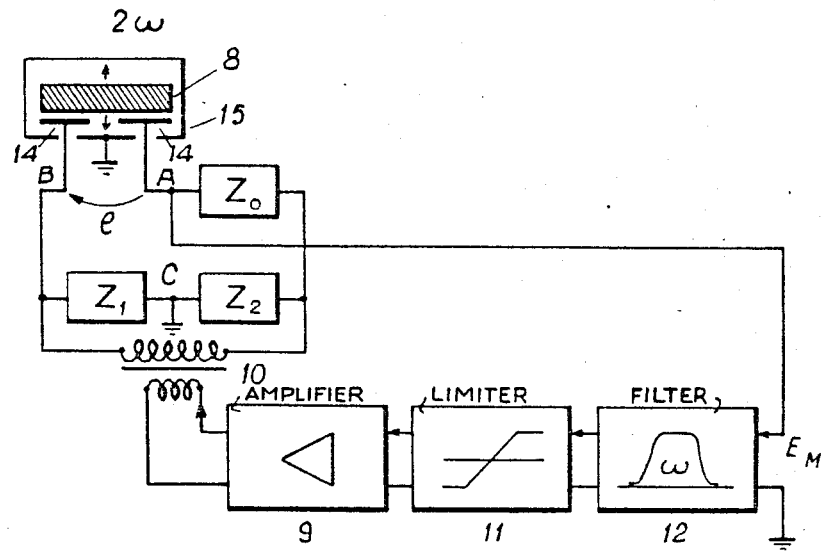
FIGS. 4 and 5 show other embodiments of the invention.

FIG. 4 shows a system using an electrostatic transducer between the terminals A and B of the Wheatstone bridge. The vibrating bar 8 is shown endwise and its lower surface is made conducting. Opposite this surface, are arranged two electrodes 14 forming with the conducting layer of the vibrating bar a pair of capacitances connected in series into the arm AB of the bridge. The transducer assembly formed in this way is surrounded by a shield 15 which is earthed to avoid any leakage of the electric field. It operates similarly to a magnetic transducer, except that the excitation of the bar results from the voltage $e$ applied between the terminals A and B and the internal impedance is much higher.

Figure 5:
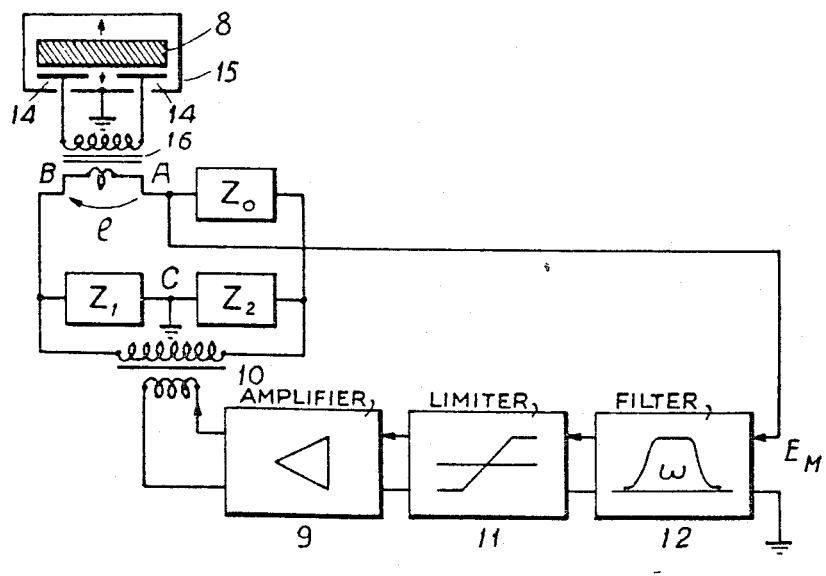

A modification of the driving circuit shown in FIG. 4 is shown in FIG. 5. A step-down transformer 16 is located between the transducer and the branch AB of the Wheatstone bridge so as to balance the bridge by means of lower impedances.

Of course the invention is not limited to the embodiments described and shown which were given solely by way of example.

What is claimed is:

1. An electroacoustic vibrator system for vibrating a mechanical structure having a predetermined resonant frequency, comprising: an electromechanical square-law transducer having an exciter circuit, a bridge including as one of its branches said circuit, said bridge being balanced with said structure at rest and having two input terminals and two output terminals; a feedback loop between said output and said input terminals; and filtering means in said loop for feeding back to said bridge electrical energy having a frequency equal to half said resonant frequency.

2. A vibrator as claimed in claim 1, wherein said transducer comprises a soft magnetic core and an exciter winding.

3. A vibrator as claimed in claim 1, further comprising: a linear pick-up transducer, coupled to said structure and having an electrical output, and filtering means tuned to said resonant frequency coupled to said output.

4. A vibrator as claimed in claim 1, wherein said loop comprises in series a band pass filter tuned to half said resonant frequency, an amplitude limiter and an amplifier.

5. A vibrator as claimed in claim 1, wherein said transducer comprises capacitor means.

6. A vibrator as claimed in claim 5, wherein said capacitor means comprises two fixed electrodes associated with said structure to build up two capacitors in series.

7. A vibrator as claimed in claim 6, including a step down transformer for coupling said capacitors to said bridge.

References Cited

UNITED STATES PATENTS

| 2,178,252 | 10/1939 | Forster | 73—67.2 |
| 3,164,987 | 1/1965 | Davidson et al. | 73—67.2 XR |
| 3,240,054 | 3/1966 | Roth | 73—67.2 XR |

RICHARD C. QUEISSER, *Primary Examiner.*

JOHN P. BEAUCHAMP, *Assistant Examiner.*